United States Patent [19]

De Lima Filho

[11] Patent Number: 4,745,521
[45] Date of Patent: May 17, 1988

[54] EXPLOSION PROOF SAFETY VALVE FOR A CONDENSER

[75] Inventor: Manoel S. De Lima Filho, Porto Alegre, Brazil

[73] Assignee: Icotron S.A. Industria de Componentes Electronicos, Brazil

[21] Appl. No.: 924,458

[22] Filed: Oct. 29, 1986

[30] Foreign Application Priority Data

Oct. 31, 1985 [BR] Brazil .................................. 8505573

[51] Int. Cl.⁴ .......................... H01G 9/00; H01G 9/16
[52] U.S. Cl. ...................................... 361/272; 361/433
[58] Field of Search ............... 220/89 A; 361/433, 272

[56] References Cited

U.S. PATENT DOCUMENTS

| 3,005,573 | 10/1961 | Dawson et al. | 220/89 A |
| 3,029,987 | 4/1962 | Gronemeyer | 220/89 A X |
| 3,878,440 | 4/1975 | Ando | 220/89 A X |
| 4,010,406 | 3/1977 | West et al. | 361/272 X |
| 4,617,611 | 10/1986 | Miura et al. | 361/433 |

Primary Examiner—Donald A. Griffin
Attorney, Agent, or Firm—Hill, Van Santen, Steadman & Simpson

[57] ABSTRACT

A safety valve for a capacitor includes a weakened portion of the capacitor casing in the form of six identical concave grooves adjoining one another at the center of the base and forming a pattern of three "V" formations so that the grooves rupture upon the appearance of an excessive pressure build-up within the capacitor casing.

4 Claims, 1 Drawing Sheet

EXPLOSION PROOF SAFETY VALVE FOR A CONDENSER

BACKGROUND OF THE INVENTION

1. Field of the Invention

The present invention relates to a casing for a condenser element having weakened wall sections.

2. Description of the Prior Art

Condenser elements in the shape of a can are known, some having a weak part in the form of two identical zones with a wall thickness of less than the thickness of the wall of the bottom part which surrounds these two zones. The zones are separated by a ridge, the thickness of which is more important than the thickness of the walls of the two zones. Such safety valves are known from U.S. Pat. No. 3,878,440, dated July 23, 1973, in which is disclosed a safety valve for an electrolytic capacitor applied to the bottom of a maltacross shaped covering. The disclosed configuration does not give sufficient rigidity to the base of the cover, enabling the cover to break under force of the coil exerted against the base and not because of the gases accumulated inside the envelope.

The problem is also addressed by a device disclosed in Brazilian Patent No. PI 8003911, dated June 19, 1980, in which is disclosed a shaped safety valve in the cover of a base. The safety valve has the shape of two half-moons separated by a central part where the half-moons are weakened. The disclosed configuration does not offer a safely operating safety valve when there is the production of gas within the envelope, since it does not always react and can cause an explosion of the cover or of the envelope.

SUMMARY OF THE PRESENT INVENTION

An object of the present invention is to provide a safety valve which operates each time there is a formation of gases within the capacitor or condenser. The principles of the present invention are embodied in a safety valve having a thin portion represented by six radially extending concave grooves. The grooves intersect one another at the center of the envelope base in which they are formed and serve to control excessive pressures within the envelope or cover.

The safety valve of the present invention operates to prevent explosions in capacitors by preventing excessive gas pressures within the capacitor. Such gas pressures can be caused by a reverse voltage in the capacitor or by an unusually large power pulse which causes an excess current resulting in the formation of gas within the cover or envelope of the capacitor. The build-up of gas within the capacitor casing causes a possibility of explosion, and, thus, the need for a safety valve.

The present invention provides a safety valve in the very structure of the capacitor and located in the bottom of the casing or envelope. The present safety valve is formed at the time of extrusion of the capacitor body so that besides a more regular pressure rupture, the present safety valve avoids damage to the printed circuit plate on which the capacitor is mounted in case there is an explosion there.

A capacitor according to the principles of the present invention has a bottom portion of the cover or envelope with two thicknesses, a thinner portion of the bottom portion being formed by six diametral, or radial, concave grooves which cut, or join, one another at the center of the base. The concave grooves serve to control the internal pressure within the capacitor. Each groove may extend as far as the perimeter of the base, depending on the diameter of the envelope or casing. The six grooves form a pattern in the form of three "V"s arranged in a uniform manner about the base portion so that their respective vertices meet at the center of this circular base.

The radial concave grooves have a controlled wall thickness, preferably along the center line of each groove. The controlled wall thickness is provided to break under a defined or predetermined pressure, although not necessarily at the center, but at any point along the groove. The present safety valve operates, or ruptures, at a pressure which is lower than the pressure at which the lid of the capacitor separates itself from the envelope.

DESCRIPTION OF THE PREFERRED EMBODIMENTS

Figure 1:
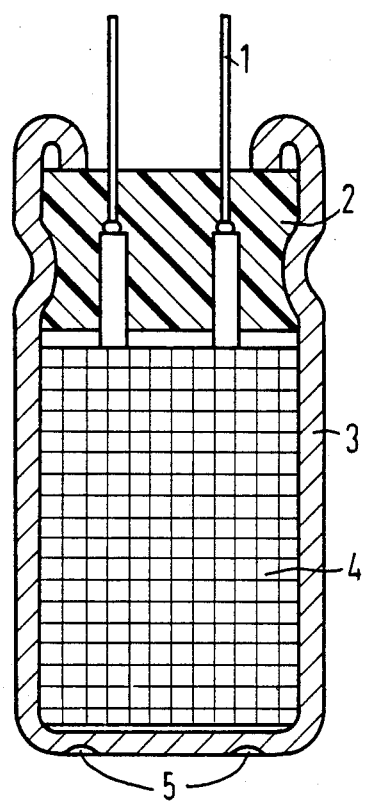
FIG. 1 is a cross-section of a capacitor for use with a safety valve according to the principles of the present invention.

A capacitor is shown in FIG. 1 having terminals 1 and a lid 2 to protect the capacitor against the entry of foreign agents, as well as to prevent corrosive chemicals from leaving the capacitor, which would damage the printed circuit plate on which the capacitor is mounted. A casing or envelope 3 extends around a body 4 of the capacitor coil. Although the casing may be of any material, it is preferably formed of aluminum. In the envelope 3, and more particularly, at the base of the envelope is a portion having a decreased thickness which forms a safety valve 6.

Figure 2:
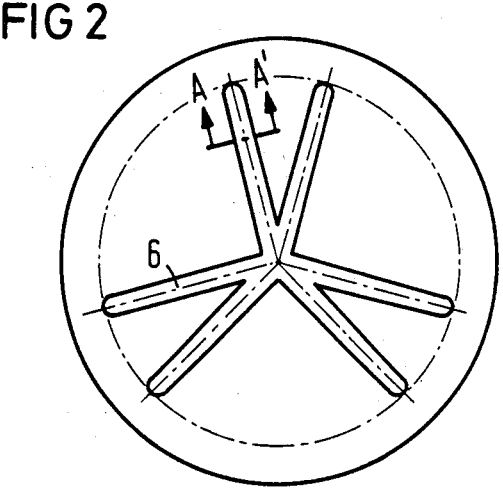
FIG. 2 is a plan view of a base portion of the envelope of the capacitor of FIG. 1, showing the present safety valve in the form of three "V"s.
Figure 3:
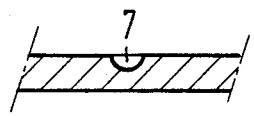
FIG. 3 is an enlarged cross-section along lines AA' through one leg of a "V".

The safety valve 6 is shown in more detail in FIG. 2 and includes six radially extending grooves making up three "V" formations. The "V" formations are arranged symmetrically about the circular base portion of a casing, the vertices of each joining at the center thereof. The "V" formations each define an angle. For instance, the angle shown in FIG. 2 is 30 degrees, so that an angle of 90 degrees is defined between the "V"s. Each of the "V" formations is formed by a pair of concave grooves, as can be seen more clearly in the cross-section of FIG. 3. The central portion of each of the grooves has a defined thickness.

The present invention operates as follows:

At the time of an irregular functioning of the capacitor, such as, for example, during a short circuit, high currents flow within the capacitor cause it to heat. Heating of the capacitor causes metal material of the coil, as well as the insulating material, to begin to vaporize. This results in the appearance of a mixture of gases which seek an outlet by exerting pressure on the walls of the envelope over the entire surface thereof, as well as on the ribbed lid. Upon the build-up of sufficient gas pressure within the gas capacitor, the thinner portions 5 of the envelope break at one or more of the "V"-shaped grooves, and, thus, enable the gases to escape and thereby avoid explosion of the capacitor.

Although modifications and changes may be suggested by those skilled in the art, it is the intention of the inventor to embody within the patent warranted hereon all changes and modifications as reasonably and properly come within the scope of his contribution to the art.

I claim as my invention:

1. A safety valve for a capacitor having a can-shaped capacitor element in a can-shaped envelope closed by a lid, comprising:

a bottom of said envelope having a thin part formed by six radial concave grooves, said concave grooves meeting one another at the center of said bottom, said concave groove providing a control for excessive pressures inside the envelope to prevent explosions, said radial concave grooves forming a pattern of three uniformly spaced "V"s, each of said "V"s defining an angle which is substantially less than an angle defined between said "V"s.

2. A safety valve as claimed in claim 1, wherein said six radial grooves have a wall thickness appreciably less than the wall thickness of the rest of the envelope so that upon the occurrence of a predetermined pressure within the envelope, one or more of said radial concave grooves will break substantially along a center line.

3. A safety valve as claimed in claim 1, wherein the envelope is of aluminum.

4. A safety valve for a cylindrical capacitor casing, comprising:

a circular portion of the capacitor casing;

six radially extending concave grooves forming thin portions in said circular bottom portion, said concave grooves being arranged symmetrically in said bottom portion and adjoining one another at a center of said bottom portion, said six radially extending concave grooves being angularly spaced in three pairs of grooves wherein each pair of grooves defines a first angle and adjacent pairs of grooves define a second angle which is greater than said first angle;

whereby at least one of said radial concave grooves ruptures at a predetermined excessive pressure to prevent explosion of the capacitor casing.

* * * * *